No. 851,891. PATENTED APR. 30, 1907.
W. A. LAYMAN.
METHOD OF ELECTRICALLY BRAKING ALTERNATING CURRENT MOTORS.
APPLICATION FILED AUG. 6, 1906.

3 SHEETS—SHEET 3.

WITNESSES:
S. S. Stout.
W. A. Alexander.

INVENTOR
W. A. Layman.
BY
Fowler & Bryson
ATTORNEYS

UNITED STATES PATENT OFFICE.

WALDO A. LAYMAN, OF ST. LOUIS, MISSOURI.

METHOD OF ELECTRICALLY BRAKING ALTERNATING-CURRENT MOTORS.

No. 851,891.　　　　　Specification of Letters Patent.　　　　Patented April 30, 1907.

Application filed August 6, 1906. Serial No. 329,352.

*To all whom it may concern:*

Be it known that I, WALDO A. LAYMAN, a citizen of the United States, residing at the city of St. Louis, in the State of Missouri, have invented a certain new and useful Method of Electrically Braking Alternating-Current Motors, of which the following is such a full, clear, and exact description as will enable any one skilled in the art to which it appertains to make and use the same, reference being had to the accompanying drawings, forming part of this specification.

Heretofore alternating current motors have been at a disadvantage relative to direct current motors in work requiring efficient braking means, because an alternating current motor cannot be inherently changed like the direct current motor from a motor to a generator in order to provide braking means. To overcome this difficulty I provide an auxiliary current either generated by the rotation of the motor or derived from an independent source and controlled by the rotation of the motor, and utilize such auxiliary current to oppose the rotation of the motor. In the preferred manner of carrying out my invention, I utilize such auxiliary current by introducing it into the motor to establish thereby a torque opposed to the momentum or inertia torque of the motor. I may, however, utilize such auxiliary current by means of a magnetic brake. My method is especially adapted for use in connection with motors for elevators, as in such work efficient and reliable braking means are especially desirable.

Figure 1:
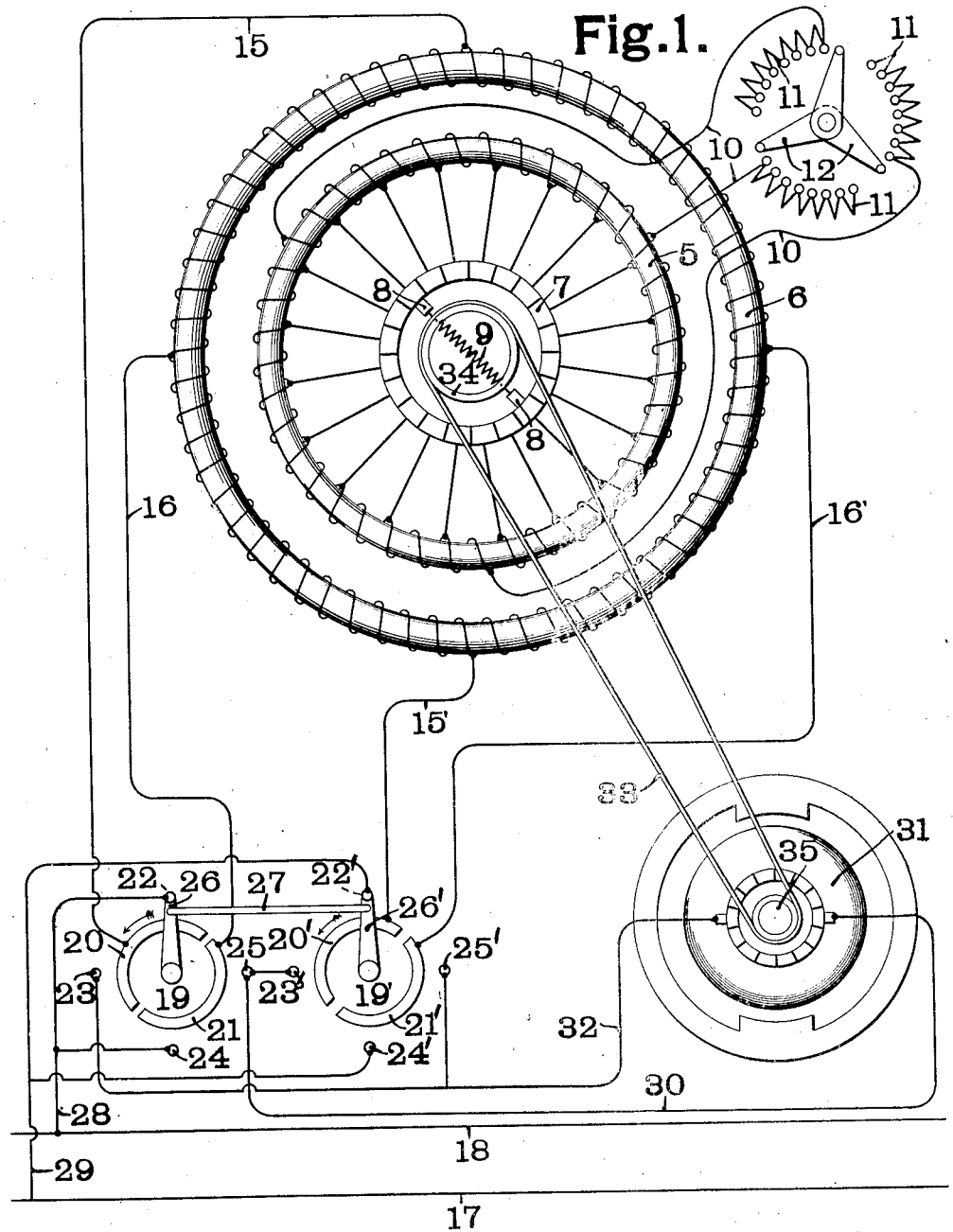
Figure 2:
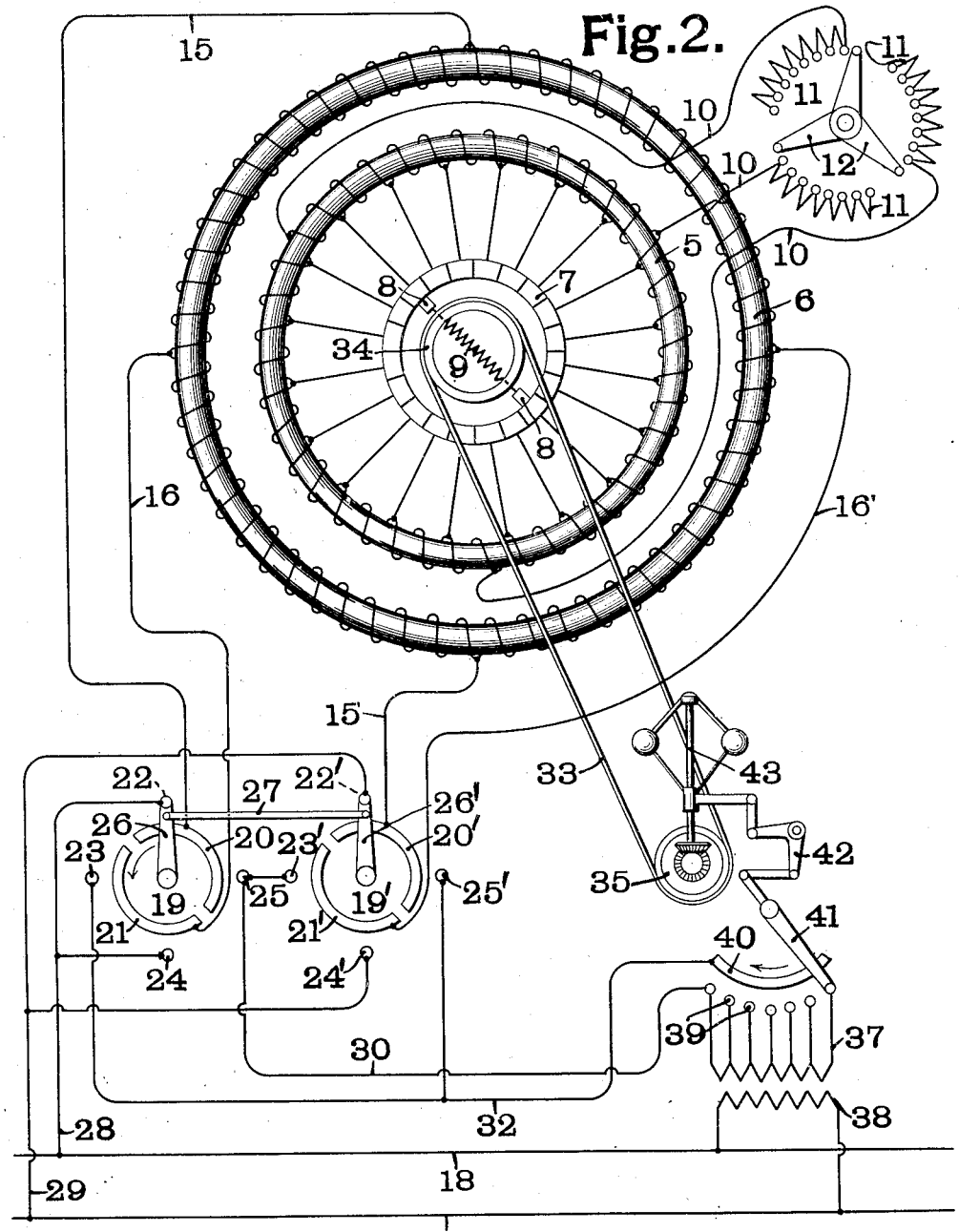
Figure 3:
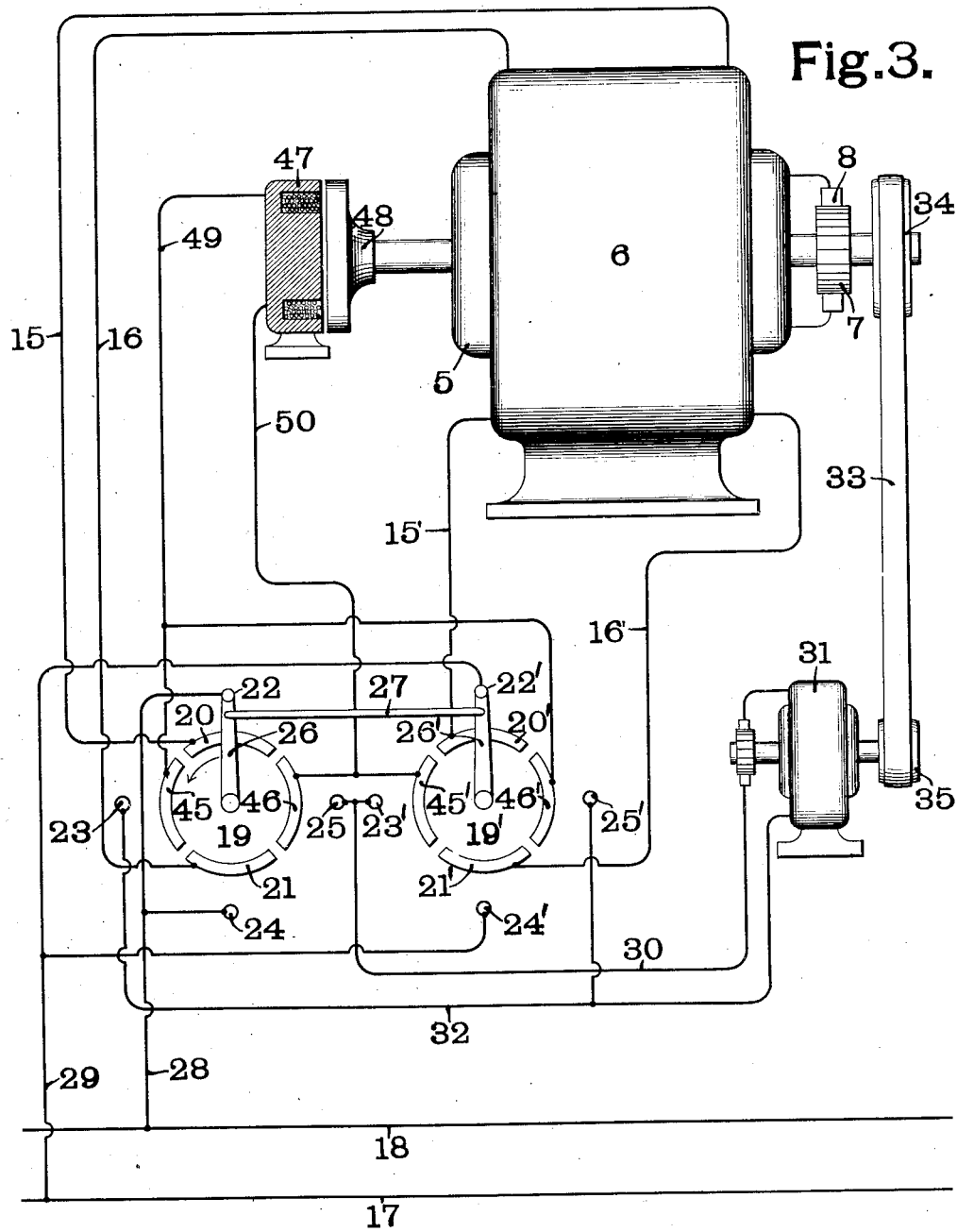

In the accompanying drawings which illustrate some forms of apparatus adapted to carry out my invention, Figure 1 is a diagram illustrating apparatus in which an auxiliary direct current is introduced into the motor to effect the braking. Fig. 2 is a diagram illustrating apparatus in which an auxiliary alternating current is introduced into the motor, and Fig. 3 is a diagrammatic view illustrating apparatus in which the auxiliary current opposes the rotation of the motor by means of a magnetic brake.

Like marks of reference refer to similar parts in the several views of the drawings.

5 represents the armature or rotor of the motor, and 6 the field or stator. In the drawings I have illustrated the type of motor known as the Schuler motor, but it will be readily understood that the principles involved may be applied to any of the well-known types of alternating current motors. In the type shown the windings of the armature or rotor 5 are connected to a commutator 7 provided with brushes 8 connected by resistance 9 so as to establish a definite line of polarity in the armature. The winding of the armature 5 is also provided with a polyphase circuit 10 containing resistances 11 adapted to be cut into or out of the circuit by means of a rotary contact member 12. The current is adapted to be led through the windings of the field 6 by means of conductors 15 and 15' so as to rotate the armature 5 in one direction, or the current may be led through the said field by means of conductors 16 and 16' to rotate the armature 5 in the opposite direction. The current for driving the motor is derived from mains 17 and 18 and is controlled by a switch mechanism now to be described.

Referring now to Fig. 1, the conductor 15 leads to an annular contact ring 19. This contact ring 19 is divided so as to form segments 20 and 21, the conductor 15 being connected to the segment 20. The conductor 16 hereinbefore referred to is connected with the segment 21. A second contact ring 19' is also provided adjacent to the ring 19 and divided to form segments 20' and 21'. The segment 20' is connected with the conductor 15' and the segment 21' with the conductor 16'. Adjacent to the contact ring 19 are contacts 22, 23, 24 and 25. Adjacent to the contact ring 19' are similar contacts 22', 23', 24' and 25'. These contacts are adapted to be connected with the rings by means of switch arms 26 and 26'. These switch arms 26 and 26' are connected by means of a link 27 so as to move in unison over the contact rings, and are adapted to move in the direction of the arrows in Fig. 1. The contacts 22 and 24 are connected by means of wires 28 with the line 18, while the contacts 22' and 24' are connected by wires 29 with the main 17. The contacts 25 and 23' are connected together and by means of a wire 30 are connected to one pole of a small direct current generator 31, the opposite pole of which is connected by means of a wire 32 with the contacts 23 and 25'. The generator 31 is driven by means of a belt 33 passing around a pulley 34 on the shaft of the armature 5 and around a pulley 35 on the armature of the direct current generator 31.

In carrying out my invention by means of the apparatus shown in Fig. 1 above described, when the parts are in position shown in Fig. 1 the current passes from the main 17 through the wire 29 to the contact 22' and thence through the switch arm 26', segment 20' and conductor 15' to the field 6 of the armature. After passing through the field the current returns by means of the conductor 15, segment 20, switch arm 26 and wire 28 to the line wire 18, thus completing the circuit through the motor and causing it to rotate in one direction. If, now, the switch arms 26 and 26' be moved in the direction of the arrow so as to bring said arms in engagement with the contacts 23 and 23', the current from the line wires will be cut off from the motor and at the same time the small generator 31 will be thrown into circuit to supply an auxiliary current to the motor. Said auxiliary current passes from the conductor 30 through contacts 25 and 23' to the switch arm 26' and thence through the segment 20' and conductor 15' to the field 6. The return circuit from the field 6 is made through the conductor 15, segment 20 and switch arm 26 to the contact 23 and thence through the conductor 32 to the generator 31, thus completing the circuit. The auxiliary current thus introduced into the field 6 of the motor will create in the said motor a torque opposed to the inertia or momentum torque of the motor and will consequently brake the motor. The said current being generated from the rotation of the motor, will be proportional to the speed of the motor, and, consequently will apply the maximum braking force when the motor is running at the highest speed, and a less braking force as the motor decreases its speed. A continued movement of the arms 26 and 26' will cause the motor first to run in the opposite direction when the arms are on contacts 24 and 24', and again to brake the motor when the said arms are on the contacts 25 and 25'.

Referring now to Fig. 2, an apparatus is shown wherein the auxiliary current is an alternating current derived from the mains. The motor shown in this figure is in all respects the same as that shown in Fig. 1 and the switch mechanism is the same except that the sectors 20 and 21 and 20' and 21' are rotated relatively to the contacts so that when the switch arms 26 are on the contacts 22 or 25 they will be on the sectors 20, and when on the contacts 23 or 24 they will be on the sectors 21. In the arrangement hereinbefore described in connection with Fig. 1, the sectors are so arranged that the arms 26 connect the contacts 22 and 23 with the sectors 20, and the contacts 24 and 25 with the sectors 21. The object of this change in the switching mechanism in the apparatus shown in Fig. 2 is to lead the auxiliary current into the field 6 by conductors at right angles to those carrying the operating current immediately before the auxiliary current is introduced into the motor. In the apparatus shown in Fig. 2 the wires 30 and 32 in place of leading to a generator lead to the secondary 37 of a transformer, the primary 38 of which is connected across the mains 17 and 18. The secondary 37 of the transformer is divided into sections connected to contacts 39, one of which is also connected with the wire 30. The wire 32 is connected to the sector 40 adjacent to the contacts 39 and adapted to be connected therewith by means of a pivoted arm 41. This arm 41 is connected by means of the system of levers 42 with a centrifugal governing device 43 which is driven from the motor by means of the belt 33 hereinbefore described, the pulley 35 driven by such belt being geared to the said governor 43. This governor is so arranged that when the motor is at speed the arm will be in the position shown in the drawings, so as to cut the entire secondary of the transformer in the circuit. When, however, the speed of the motor decreases, the arm 41 will be moved in the direction of the arrow in the drawings so as to gradually cut the transformer out of circuit, until when the motor is at rest the entire secondary of the transformer will be cut out.

In the operation of the device shown in Fig. 2, the driving current is carried through the motor when the parts are in the position shown in the figure by circuits similar to those first described in connection with apparatus in Fig. 1. When, however, the arms 26 and 26' are moved on to the contacts 23 and 23', the auxiliary current from the transformer secondary 37 will pass over the line 30 through the contacts 25 and 23' to the arm 26' and thence through the conductor 16' to the field 6. The return circuit is through the conductor 16, and thence through the sector 21 and arm 26 to the contact 23 and through the conductor 32 back to the transformer. It will thus be seen that the auxiliary current is introduced into the motor through the conductor 16 and 16' at right angles to the conductors 15 and 15' from which the main driving current has been cut off. This current when so applied produces in the motor a torque opposed to the inertia or momentum torque of the motor and thus brings it to rest. As the speed of the motor decreases the centrifugal governor 43 will cause the arm 41 to move in the direction of the arrow so as to gradually cut the secondary of the transformer out of circuit and thus regulate the auxiliary current so that it is proportional to the speed of the motor, and when the motor has come to rest the secondary will be entirely cut out so that no loss of energy will take place in the transformer while the motor is at rest.

In the apparatus shown in Fig. 3 the arrangement of parts are the same as that shown in Fig. 1 with the exceptions hereinafter to be described. The contact rings 19 and 19' of this apparatus are each divided into four sectors in place of two, the additional parts 45 and 46 and 45' and 46' being connected to a magnetic brake 47 placed adjacent to a disk 48 on the shaft of the armature 5. One wire 49 leading from said magnetic brake is connected to the sectors 45 and 46', and the other line 50 is connected to the sectors 46 and 45'.

In the operation of the apparatus shown in Fig. 3, when the parts are in the position shown in the figure the current will pass through the motor by circuits like those described in connection with the apparatus in Figs. 1 and 2. When, however, the arms 26 and 26' are moved in the direction of the arrow so as to bring said arms in engagement with the contacts 23 and 23', the current from the generator 31 will pass through the wire 30 to the contact 23' and thence through the arm 26' and sector 45' to the conductor 50 leading to the magnetic brake 47. The current returns from the said brake 47 through the conductor 49 to the sector 45 and thence through the arm 26 and line 32 and thence through the arm 26, completing it returns to the generator 31, completing the circuit. The action of the brake 47 is to draw the disk 48 against it so that the friction between the two parts opposes the rotation of the motor and brings it to rest. The current energizing the brake 47, being furnished by the generator 31 driven from the motor, is proportional to the speed of the motor, thus furnishing braking power of greater or less amount, according as the motor is rotating with greater or less speed.

Having fully described my invention, what I claim as new and desire to secure by Letters Patent of the United States, is—

1. The method of braking an alternating current motor, which consists, after the main driving current has been cut off from the motor, in varying an auxiliary current with the speed of the motor, and applying said auxiliary current to oppose the rotation of the motor.

2. The method of braking an alternating current motor, which consists, after the main driving current has been cut off from the motor, in generating an auxiliary current by the rotation of the motor, and applying said auxiliary current to oppose the rotation of the motor.

3. The method of braking an alternating current motor, which consists in introducing into the motor, after the main driving current has been cut off from the motor, an auxiliary current, and reorganizing the windings to establish thereby a torque opposed to the inertia or momentum torque of the motor.

4. The method of braking an alternating current motor, which consists in introducing into the motor, after the main driving current has been cut off from the motor, an auxiliary direct current, and reorganizing the windings to establish thereby a torque opposed to the inertia or momentum torque of the motor.

5. The method of braking an alternating current motor, which consists in introducing into the motor, after the main driving current has been cut off from the motor, an auxiliary current varying with the speed of the motor, and reorganizing the windings to establish thereby a torque opposed to the inertia or momentum torque of the motor.

6. The method of braking an alternating current motor, which consists in introducing into the motor, after the main driving current has been cut off from the motor, an auxiliary current generated by the rotation of the motor, and reorganizing the windings to establish thereby a torque opposed to the inertia or momentum torque of the motor.

7. The method of braking an alternating current motor, which consists in introducing into the motor, after the main driving current has been cut off from the motor, an auxiliary direct current varying with the speed of the motor, and reorganizing the windings to establish thereby a torque opposed to the inertia or momentum torque of the motor.

8. The method of braking an alternating current motor, which consists in introducing into the motor, after the main driving current has been cut off from the motor, an auxiliary direct current generated by the rotation of the motor, and reorganizing the windings to establish thereby a torque opposed to the inertia or momentum torque of the motor.

In testimony whereof, I have hereunto set my hand and affixed my seal in the presence of the two subscribing witnesses.

WALDO A. LAYMAN. [L. S.]

Witnesses:
 A. C. FOWLER,
 BENNETTE PIKE.